Sept. 6, 1955     G. A. BRUNDRETT     2,717,058

SHOCK ABSORBER CONTROL VALVE

Filed Nov. 20, 1952

INVENTOR.
GEORGE A. BRUNDRETT
BY
Willets Hardman and Fehr
HIS ATTORNEYS

United States Patent Office 2,717,058
Patented Sept. 6, 1955

2,717,058

SHOCK ABSORBER CONTROL VALVE

George A. Brundrett, Detroit, Mich., assignor to General Motors Corporation, Detroit, Mich., a corporation of Delaware Application November 20, 1952, Serial No. 321,657

7 Claims. (Cl. 188—88)

This invention relates to an improved shock absorber of the direct acting type, and particularly to certain of the valves for controlling restrictive flow of hydraulic fluid between opposite ends of the shock absorber cylinder.

It is an object of the invention to provide a double acting hydraulic shock absorber of the direct acting type with an improved fluid flow control valve that effects a first restriction to fluid flow and upon increasing pressure or flow effects a second restriction to provide for larger flow of fluid between opposite ends of the shock absorber cylinder.

It is another object of the invention to provide a control valve for an hydraulic shock absorber wherein a flexible valve member is engaged by a rigid valve retainer formed to a shape permitting the flexible valve member to flex relative to the valve retainer to secure an initial restriction to the flow of fluid between opposite ends of the hydraulic cylinder and thereafter effect a second restriction to the flow in the same direction upon increasing pressure or flow of fluid.

It is still another object of the invention to provide a double acting hydraulic shock absorber of the direct acting type wherein a plurality of restrictions to flow of fluid between opposite ends of the hydraulic cylinder become sequentially effective, and also wherein the sequence of effective restrictions to flow of hydraulic fluid is greater in one direction of flow of fluid than in the other.

Further objects and advantages of the present invention will be apparent from the following description, reference being had to the accompanying drawing wherein a preferred embodiment of the present invention is clearly shown.

Figure 1:
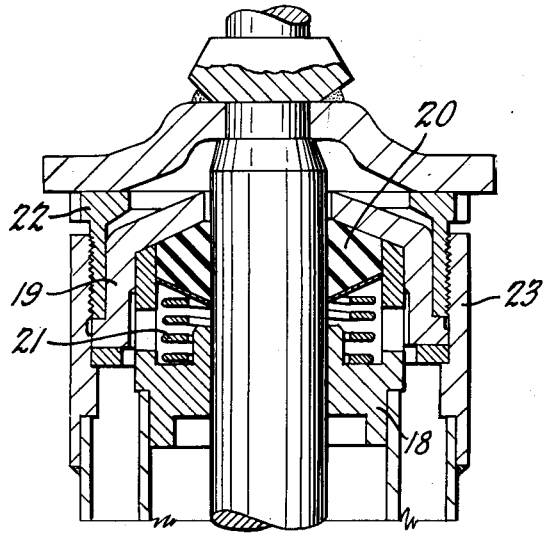
Fig. 1 is a longitudinal, cross sectional view of a direct acting type hydraulic shock absorber incorporating the features of this invention.
Figure 1:
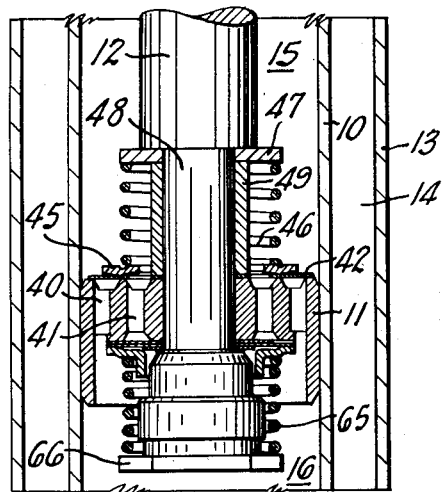
Figure 1:
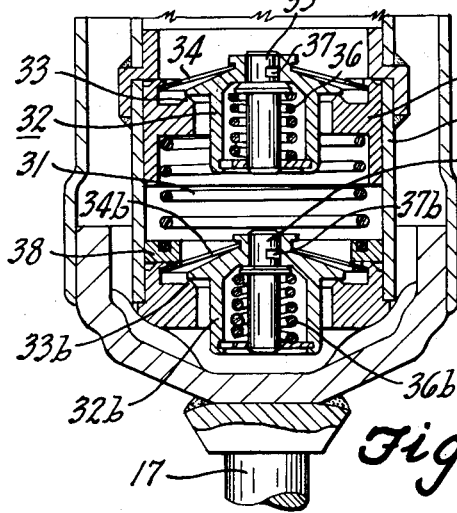

The shock absorber of this invention comprises a cylinder 10 in which a piston 11 reciprocates for transfer of hydraulic fluid between opposite ends of the cylinder 10.

The piston 11 is carried on the lower end of an actuating rod 12, the rod 12 being connected to a sprung mass of a motor vehicle, such as the body.

The cylinder 10 is surrounded with a cylindrical member 13 to provide a reservoir space 14 which receives hydraulic fluid flow as a result of the differential of volume in the chamber 15 above the piston 11 relative to the chamber 16 below the piston 11. The cylindrical member 13 forming the outer cylinder of the shock absorber is secured to the unsprung mass of the automotive vehicle, such as the wheel axle, by way of the rod connection 17.

The upper end of the cylinder 10 is closed by a cap member 18 that forms a guide for the rod 12, and through which the rod 12 extends. Between the cap member 18 and a second cap member 19 there is provided a resilient seal 20. The seal 20 engages the rod 12 to seal against loss of hydraulic fluid from within the shock absorber. A spring 21 resiliently applies pressure upon the resilient seal 20 to maintain the same in pressure engagement with the rod 12. The cap member 19 is retained upon the cylindrical member 13 by a screw threaded member 22, that threadedly engages the member 23 on the upper end of the member 13.

The lower end of the cylinder 10 carries an auxiliary cylinder 10a containing a free piston 30 that is normally held in the upper position illustrated in Fig. 1, by means of the spring 31. The piston 30 receives the valve member 32 that seats upon the valve seat 33 as retained by a resilient spring 34.

The valve member 32 carries a valve element 35 held in its upward position by means of a spring 36. The valve element 35 has an opening 37 in the periphery thereof to provide for flow of fluid through the valve element 32 when the valve member 35 is moved downwardly against the spring element 36.

A similar valve arrangement is provided in the lower end of the cylinder 10a with the corresponding parts thereof numbered correspondingly with the suffix "b." The valve structures contained in the cylinder 10a and the piston 30 are like those disclosed in my copending application, Serial No. 275,577, filed March 8, 1952, now Patent Number 2,695,079, and operate in the same manner as described therein.

Briefly, when there is movement of the shock absorber piston 11 toward the cylinder portion 10a, hydraulic liquid in the chamber 16 initially moves the piston 30 downwardly. This causes the valve member 35b to move downwardly for flow of liquid into the reservoir 14. As the relative movement continues between piston 11 and cylinder portion 10a, the piston 30 ultimately engages the ring 38. Thereafter, excess flow of the hydraulic liquid from the chamber 16 moves valve 35 downwardly for passage of liquid through valve 35b and thence to the reservoir.

On movement of piston 11 away from the cylinder portion 10a hydraulic fluid moves from the reservoir through the valve members 32b and 32 into the cylinder chamber 16, valve members 32b and 32 raising against their springs 34b and 34 respectively.

Figure 2:
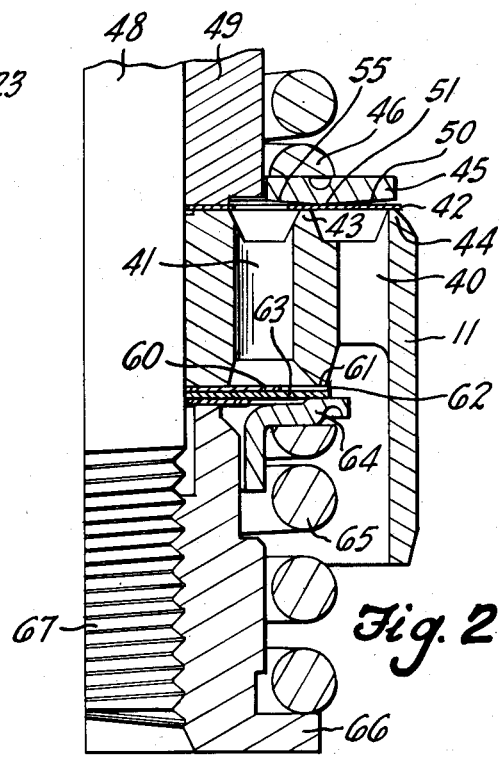
Fig. 2 is an enlarged cross sectional view of the piston and piston valve of the shock absorber.
Figure 3:
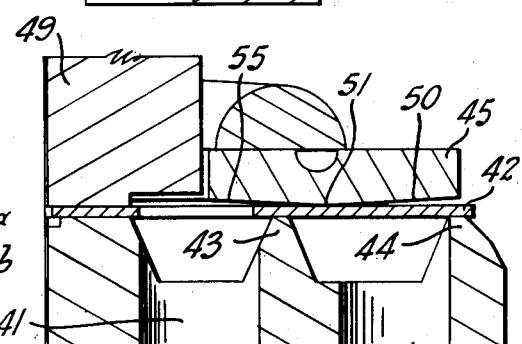
Fig. 3 is a cross sectional view, enlarged still further than Fig. 2, of one of the valve structures of the piston.

The control valving of this invention concerns the valving on the piston 11, as is more particularly illustrated in Figs. 2 and 3.

The piston 11 is provided with a plurality of circularly arranged passages 40 that provide for flow of hydraulic fluid between opposite ends of the piston when the chamber 16 is reduced in volume resulting from relative movement between piston 11 and cylinder 10. A second series of circularly arranged passages 41 in the piston 11 provides for transfer of hydraulic fluid from chamber 15 to chamber 16 upon increasing volume of chamber 16 resulting from relative movement between the piston 11 and cylinder 10.

The passages 40 are closed by means of a flexible valve disc 42 that engages the annularly arranged annular valve seats 43 and 44 provided on the piston 11. A rigid retainer member 45 is placed upon the valve disc 42, the retainer being in turn engaged by a compression spring 46 to urge the valve disc 42 against or toward the seats 43 and 44.

The spring 46 engages a retaining washer 47 carried on the reduced diameter portion 48 of the rod 12. A spacer member 49 of a predetermined length governs compression of the spring 46 upon the retainer member 45.

The retainer member 45 has the lower face portion 50 thereof, which is positioned against the valve disc 42, formed angularly relative to the face of the valve disc with the apex 51 of the angle formed between the face portion 50 and the valve disc 42 disposed near one of the pair of valve seats 43 or 44. As illustrated, the apex 51 of the aforesaid angle is disposed near the inner valve seat 43 so that the outer perimeter of the valve disc 42 may be flexed relative to the retainer 45 by pressure of fluid beneath the valve member 42.

The lower face of the rigid valve retainer 45 also has the inner face portion 55 disposed angularly relative to the valve disc 42 with the apex of the angle formed between the face portion 55 and the valve 42 disposed between the pair of valve seats 43 and 44. In fact the apex of the angle just mentioned coincides with the apex 51 heretofore mentioned.

With the apex 51 engaging the valve disc 42 between the annular valve seats 43 and 44, sufficient pressure is applied to the valve disc 42 to cause it to flex slightly to seat upon the seats 43 and 44 in the event of any slight irregularities between the height of the seats 43 and 44.

The member 49 is substantially square in cross section whereby to provide for fluid flow passages around the member 49 into the passages 41 for flow of hydraulic fluid downwardly through the passages 41.

The passages 41 are closed by a flexible valve member comprising an orifice disc 60 that rests upon the seat 61. The orifice disc 60 has the edge thereof notched to provide for one or more fixed orifices 62 for flow of hydraulic liquid in either direction in the passage 41. A valve disc 63 engages the orifice plate 60 and is retained against the same by a retaining member 64 engaged by a compression spring 65.

The compression spring 65 is held against the retainer 64 by means of a nut 66 threadedly engaging the threaded end 67 of the rod 12, the nut 66 also securing the entire piston and valve assembly on the end of the rod 12.

In operation, when relative movement is caused between the piston 11 and the cylinder 10 to reduce the volume of chamber 16 causing transfer of liquid into the chamber 15 through the passages 40, liquid initially flows through the fixed orifice 62 in the orifice plate 60. When relative movement is such as to cause transfer at a greater rate than that permitted by orifice 62, the valve disc 42 will then flex upwardly against the rigid retainer plate 45 as permitted by the angularity of the face portion 50 of the member 45. As the requirement for flow further increases, the valve member 42 and retainer 45 will be moved bodily against the compression of spring 46. Thus, three specific rates of resistance are established to flow of fluid between chamber 16 and chamber 15 upon relative movement in one direction between piston 11 and cylinder 10.

Upon reverse relative movement between piston 11 and cylinder 10, causing transfer of liquid from chamber 15 to chamber 16, liquid first flows through the fixed orifice 62 in orifice plate 60. As flow requirements increase, orifice plate 60 and valve disc 63 move bodily against retainer 64 and against the resistance of spring 65 to allow increased flow through passage 41.

It will thus be seen that in one direction of relative movement between piston 11 and cylinder 10 three resistance measures are provided against flow of fluid between opposite ends of the cylinder 10 whereas in the opposite relative movement between piston 11 and cylinder 10, two resistance measures are provided against the reverse flow of the hydraulic liquid.

Figure 4:
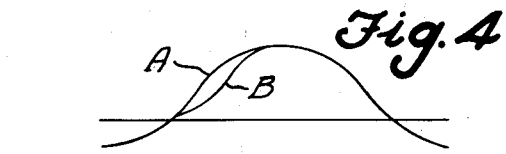
Fig. 4 is a schematic representation on a chart of the effect obtained by the use of the valve illustrated in Fig. 3.

Fig. 4 diagrammatically illustrates the advantage of the use of the angular face 50 on the rigid retainer 45 allowing for initial flexure of the valve disc 42. Without this flexure being permitted a pressure curve represented by the curve "A" of Fig. 4 is obtained. With the structural arrangement illustrated in Figs. 2 and 3, the initial flexure of valve disc 42 relative to the retainer 45 provides for a reduced resistance to the flow of liquid during the initial relative movement between piston 11 and cylinder 10 causing a more gradual pressure rise represented by the curve "B" of Fig. 4. This results in a softer "ride" in the automotive vehicle.

While the embodiment of the present invention as herein disclosed, constitutes a preferred form, it is to be understood that other forms might be adopted.

What is claimed is as follows:

1. A control valve in an hydraulic shock absorber, including in combination, piston means having passage means therein for flow of fluid in one direction between opposite ends of the said piston means, a flexible valve disc on said piston closing said passage means, a rigid valve retainer disc positioned on said valve member and having the valve engaging face thereof formed to provide for flexure of said valve disc relative to said piston and said retainer to open thereby said passage means, pressure of fluid against said valve member first flexing the same to a position against said retainer to provide a first restrictive variably increasing flow of fluid through said passage means to a predetermined maximum flow and thereafter bodily lifting said valve member and said retainer to provide a second restrictive variably in increasing flow of fluid through said passage means greater than said first flow, and resilient means acting on said retainer urging said valve member to close said passage means.

2. In an hydraulic shock absorber, piston means having a pair of annularly arranged annular valve seats, said piston means having passage means therein terminating at one end thereof between said valve seats for flow of fluid in one direction between opposite ends of said piston means, a flexible valve disc seating upon said seats and closing said passage means against flow of fluid therethrough, a rigid valve retainer positioned on said valve disc and having the face engaging the valve disc formed angularly to the plane of the valve seats to provide for flexure of said valve disc toward said retainer axially of the disc with the apex of flexure disposed between the said annular seats, whereby pressure of fluid against said valve disc first flexes the same to provide for a first restrictive flow of fluid through said passage means and thereafter bodily lifts said disc and said retainer to provide a second restrictive flow of fluid through said passage means, and resilient means acting on said retainer urging said valve disc to close said passage means.

3. A control valve in an hydraulic shock absorber, including in combination, piston means having a pair of annularly arranged annular valve seats, said piston means having fluid flow passage means therein terminating at one end thereof between said valve seats, a flexible disc valve member positioned on said valve seats to close against flow of fluid through said passages, a rigid valve disc retainer positioned on said valve disc, and spring means engaging said retainer resiliently urging the same against said valve disc to urge said disc upon the valve seats, said retainer having the face thereof that is positioned against said valve disc formed angularly relative to the face of said valve disc with the apex of the angle therebetween disposed near one of said pairs of said valve seats, whereby to provide for flexing of said valve disc between the other of said pair of valve seats and the angular face of said retainer.

4. A control valve in an hydraulic shock absorber, including in combination, piston means having a pair of annularly arranged annular valve seats, said piston means having fluid flow passage means therein terminating at one end thereof between said valve seats, a flexible disc valve member positioned on said valve seats to close against flow of fluid through said passages, a rigid valve disc retainer positioned on said valve disc, and spring means engaging said retainer resiliently urging the same against said valve disc to urge said disc upon the valve seats, said retainer having the face thereof that is positioned against said valve disc formed angularly relative to the face of said valve disc with the apex of the angle therebetween disposed near the inner of said pair of valve seats, whereby to provide for flexing of said valve disc between the outer of said seats of said pair of valve seats and the angular face of said retainer.

5. A control valve for an hydraulic shock absorber, including in combination, piston means having a pair of annularly arranged annular valve seats, said piston means having fluid flow passage means therein terminating at one end thereof between said valve seats, a flexible disc valve member positioned on said valve seats to close against flow of fluid through said passages, a rigid valve disc retainer positioned on said valve disc, and spring means engaging said retainer resiliently urging the same against said valve disc to urge said disc upon the valve seats, said retainer having the face thereof that is positioned against said valve disc formed angularly relative to the face of said valve disc in opposite directions with the apex of the angles formed therebetween disposed near one of the said pairs of valve seats and between the said seats, whereby to provide for flexing of said valve disc between the other of said pair of valve seats and the angular face of said retainer.

6. A control valve for an hydraulic shock absorber, including in combination, piston means having a pair of annularly arranged annular valve seats, said piston means having fluid flow passage means therein terminating at one end thereof between said valve seats, a flexible disc valve member positioned on said valve seats to close against flow of fluid through said passages, a rigid valve disc retainer positioned on said valve disc, and spring means engaging said retainer resiliently urging the same against said valve disc to urge said disc upon the valve seats, said retainer having the face thereof that is positioned against said valve disc formed angularly relative to the face of said valve disc in opposite directions with the apex of the angles formed therebetween disposed near the inner of the said pair of valve seats and between the said seats, whereby to provide for flexing of said valve disc between the outer of said pair of valve seats and the angular face of said retainer.

7. In an hydraulic shock absorber, the combination of, a piston reciprocable within a cylinder for transfer of liquid between opposite ends of said cylinder, said piston having first passage means therein for flow of liquid through said piston in one direction, a first disc valve means on one end of said piston closing said first passage means and including fixed orifice means providing restrictive flow of liquid through said first passage means in either direction of flow of liquid between opposite ends of said cylinder, resilient means urging said first valve means closed, second passage means providing for flow of liquid between opposite ends of said cylinder in one direction only, a second valve means closing said second passage means said second valve means including a flexible disc valve member closing said second passage means and a rigid valve retainer covering said disc valve member and having the valve engaging face formed angularly relative to the plane of the disc valve to provide for flexure of said disc valve member relative to and against said retainer to open restrictively said second passages, and resilient means engaging said retainer urging said disc valve member closed against said second passages, said valve means on said piston providing for a first fixed restrictive flow of liquid between opposite ends of said cylinders with a second restrictive flow followed thereafter by a third restrictive flow when the liquid moves in one direction between opposite ends of said cylinder, and further providing a first fixed restrictive flow and thereafter a second restrictive flow of liquid between opposite ends of said cylinder when the liquid moves in the opposite direction.

References Cited in the file of this patent

UNITED STATES PATENTS

| | | |
|---|---|---|
| 1,818,140 | Lang | Aug. 11, 1931 |
| 2,087,451 | Rossman et al. | July 20, 1937 |
| 2,527,034 | Rossman | Oct. 24, 1950 |
| 2,609,893 | Glassford | Sept. 9, 1952 |
| 2,630,193 | Funkhouser | Mar. 3, 1953 |

FOREIGN PATENTS

| | | |
|---|---|---|
| 659,581 | Great Britain | Oct. 24, 1951 |